United States Patent
So et al.

(10) Patent No.: US 10,768,672 B2
(45) Date of Patent: Sep. 8, 2020

(54) INSERT MOLDED HINGE

(71) Applicant: HEWLETT-PACKARD DEVELOPMENT COMPANY, L.P., Houston, TX (US)

(72) Inventors: Yu-Chen So, Taipei (TW); Chienchih Chiu, Taipei (TW); Chih-Hsiung Liao, Taipei (TW); Lien-Chia Chiu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 14 days.

(21) Appl. No.: 16/074,455

(22) PCT Filed: Oct. 7, 2016

(86) PCT No.: PCT/US2016/056092
§ 371 (c)(1),
(2) Date: Aug. 1, 2018

(87) PCT Pub. No.: WO2018/067179
PCT Pub. Date: Apr. 12, 2018

(65) Prior Publication Data
US 2019/0064887 A1 Feb. 28, 2019

(51) Int. Cl.
*G06F 1/16* (2006.01)
(52) U.S. Cl.
CPC .......... *G06F 1/1681* (2013.01); *G06F 1/1616* (2013.01)
(58) Field of Classification Search
CPC ........ G06F 1/1681; G06F 1/1616; G06F 1/16; G06F 1/18; H01R 12/79; H01R 13/516; H01R 313/701; H01R 13/73; H01R 2201/06; H05K 7/12; E05D 2011/085
See application file for complete search history.

(56) References Cited

U.S. PATENT DOCUMENTS

| 5,145,087 A * | 9/1992 | Weger, Jr. ............ B65D 43/167 220/845 |
| 5,206,790 A | 4/1993 | Thomas et al. |
| 6,078,496 A * | 6/2000 | Oguchi ................. G06F 1/1616 16/223 |

(Continued)

FOREIGN PATENT DOCUMENTS

| CN | 201627815 U | 11/2010 |
| CN | 101283306 B | 12/2010 |

(Continued)

OTHER PUBLICATIONS

RU 2377448-MT (Year: 2019).*

*Primary Examiner* — Adrian S Wilson
(74) *Attorney, Agent, or Firm* — Tong Rea Bentley & Kim LLC

(57) ABSTRACT

In example implementations, a hinge is provided. The hinge comprises a first hinge plate having at least one opening, where the first hinge plate is coupled to a system cover via at least one fastener fitted through the at least one opening. The hinge comprises a second hinge plate movably coupled to the first hinge plate, where the second hinge plate comprises a tab member that is coupled to a display cover via an insert molding process. The hinge comprises a hinge cap to enclose a portion of the first hinge plate and the second hinge plate that are movable coupled.

13 Claims, 4 Drawing Sheets

(56) References Cited

U.S. PATENT DOCUMENTS

| | | | |
|---|---|---|---|
| 6,083,010 A * | 7/2000 | Daoud | E05D 11/0081 |
| | | | 439/31 |
| 6,317,927 B1 * | 11/2001 | Lai | G06F 1/1616 |
| | | | 16/338 |
| 7,062,837 B1 | 6/2006 | Butler | |
| 7,580,518 B2 | 8/2009 | Harmon et al. | |
| 8,659,886 B2 | 2/2014 | Tseng et al. | |
| 8,885,299 B1 * | 11/2014 | Bennin | G11B 5/4833 |
| | | | 360/294.3 |
| 8,896,783 B2 | 11/2014 | Yu et al. | |
| 8,971,028 B2 | 3/2015 | Mcclure et al. | |
| 9,829,929 B1 * | 11/2017 | Yu | G06F 1/1616 |
| 2009/0059490 A1 | 3/2009 | Oogami | |
| 2010/0238621 A1 * | 9/2010 | Tracy | G06F 1/1698 |
| | | | 361/679.27 |
| 2011/0222238 A1 * | 9/2011 | Staats | G06F 1/1632 |
| | | | 361/679.55 |
| 2014/0036423 A1 * | 2/2014 | Tanaka | G06F 1/1681 |
| | | | 361/679.01 |
| 2016/0132077 A1 | 5/2016 | Cheah et al. | |
| 2016/0378141 A1 * | 12/2016 | Schwager | G06F 1/1626 |
| | | | 361/679.26 |
| 2019/0194990 A1 * | 6/2019 | Yoo | H05K 5/0247 |

FOREIGN PATENT DOCUMENTS

| | | |
|---|---|---|
| CN | 101799592 B | 12/2012 |
| GB | 2140073 A | 11/1984 |
| JP | 2006295384 A | 10/2006 |
| RU | 2377448 C1 | 12/2009 |
| TW | 201447125 A | 12/2014 |
| WO | 2007042633 A1 | 4/2007 |
| WO | WO-2007/042633 A1 | 4/2007 |
| WO | 2014084818 A1 | 6/2014 |

* cited by examiner

INSERT MOLDED HINGE

BACKGROUND

Laptop computers have a keyboard portion that houses most of the internal components of the computer, such as for example, the processor, memory, motherboard, drivers, network cards, power source, and the like. The laptop computers may also have a screen portion that is coupled to the keyboard portion.

When the laptop computer is closed such that the screen portion is laid on top of the keyboard portion, the laptop computer may have an overall thickness or "z stack" dimension. As the design of laptop computers continues to evolve, consumers tend to desire a laptop computer having a thinner overall thickness or "z stack" dimension.

DETAILED DESCRIPTION

The present disclosure discloses a hinge and methods for an insert molding process of the hinge to a laptop computer cover. As discussed above, as the design of laptop computers continues to evolve, consumers tend to desire a laptop computer (e.g., a mobile endpoint device) having a thinner overall thickness or "z stack" dimension. The size of components within the laptop computer has continued to shrink to the point that other components (e.g., components that connect a system cover to a display cover) are accounting for larger components of the overall thickness of the laptop computer.

The present disclosure provides a new hinge design and insert molding process that reduces the overall thickness of the laptop computer. In addition, the new hinge design also provides additional space within a display cover to run wiring or other components.

Figure 1:
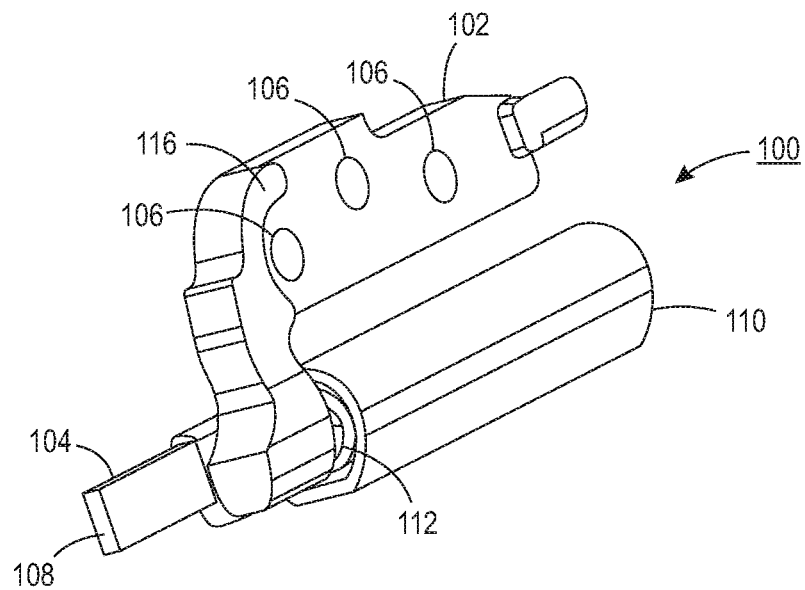
FIG. 1 is a block diagram of an example hinge of the present disclosure.

FIG. 1 illustrates a block diagram of an example hinge 100 of the present disclosure. The hinge 100 may include a first hinge plate 102 and a second hinge plate 104. In one implementation, the first hinge plate 102 may include an extended member portion 116. The extended member portion 116 may provide a surface area for one or more openings 106.

In one example, the second hinge plate 104 may comprise a tab member 108. The tab member 108 may have a rectangular shape that is long enough to be insert molded into a display cover. The tab member 108 may be fabricated from stainless steel and have a solid shape. In other words, the tab member 108 may be free from any openings. Said another way, the tab member 108 does not have any holes or openings. Although the tab member 108 is illustrated as having a rectangular shape, it should be noted that the tab member 108 may have any elongated shape, such as for example, a cylindrical shape, a "T" shape, and the like.

In one implementation, the first hinge plate 102 and the second hinge plate 104 may extend in opposition directions. For example, the tab member 108 may be formed towards one direction and the extended member portion 116 may be formed towards an opposite direction. Said another way, the first hinge plate 102 and the second hinge plate 104 do not overlap. More specifically, the extended member portion 116 and the tab member 108 do not overlap.

In one example, the second hinge plate 104 may be movably coupled to the first hinge plate 102 via a mechanical coupling 112. The mechanical coupling 112 may allow the second hinge plate 104 to rotate. In one example, the mechanical coupling 112 may allow rotation while holding a desired position when the mechanical coupling 112 is not moved or rotated. For example, the weight of a display of the laptop computer may be held in position by the mechanical coupling 112 without falling closed.

The first hinge plate 102 and the second hinge plate 104 may be covered by a hinge cap 110. The hinge cap 110 may cover the mechanical coupling 112 of the first hinge plate 102 to the second hinge plate 104 to provide a cleaner cosmetic appearance when the hinge 100 is coupled to the covers of a laptop computer.

Figure 2:
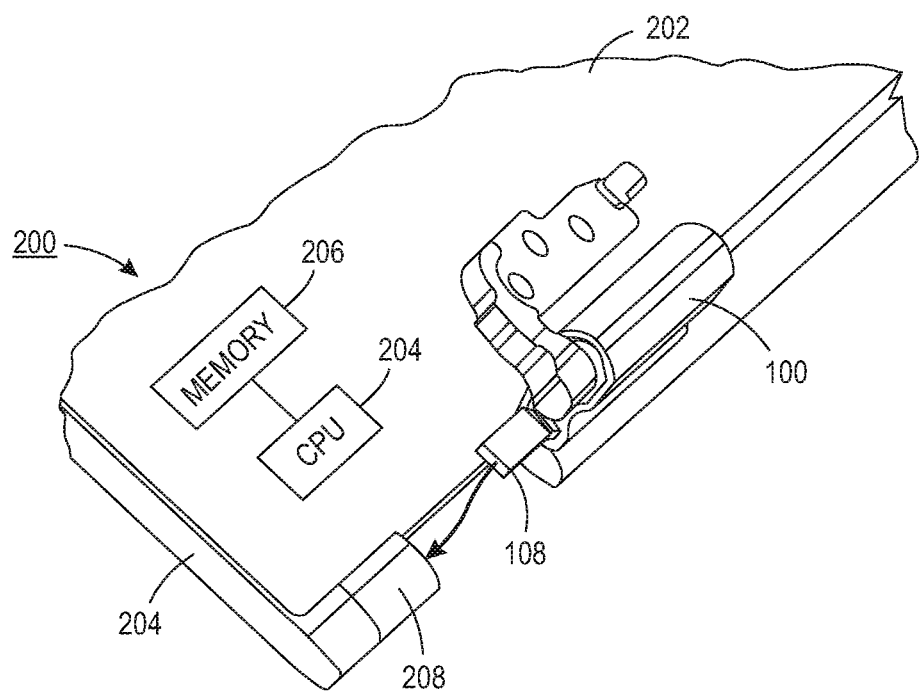
FIG. 2 is a block diagram of an example hinge that is inserted via a molding process to a cover of a laptop computer.

FIG. 2 illustrates a block diagram of an example of the hinge 100 that is inserted via a molding process to a display cover 204 of a laptop computer 200. In one example, the display cover 204 may enclose or house the liquid crystal display (LCD) display of the laptop computer 200. As noted above, as LCD displays become thinner and thinner, the limiting factor in achieving a thinner laptop computer 200 may be how the display cover 204 is coupled to a system cover 202.

In one example, the second hinge plate 104 may be coupled to the display cover 204 via an insert molding process. For example, the tab member 108 may be placed inside of a predefined space in a mold for the display cover 204. A melted metal may be poured, or cast, into the mold with the tab member 108 inside of the mold. The melted metal may be magnesium (Mg), aluminum (Al), stainless steel, and the like.

The melted metal may enclose the tab member 108 and the metal may be allowed to cool. When the metal is solidified, the tab member 108 may be coupled to the display cover 204 via a corresponding opening 208 that is formed by the metal solidifying around the tab member 108 in the mold. In other words, the tab member 108 of the second hinge plate 104 may be fixed by the solidified metal.

It should be noted that the process may be repeated for a second hinge 100. In other words, although only a single hinge 100 is illustrated in FIG. 2, the display cover 204 may include two hinges 100, e.g., one hinge on each side (e.g., a first hinge 100 near a left side and a second hinge 100 near a right side).

In one example, the second hinge plate 104 and the corresponding opening 208 run along a common line. In other words, the display cover 204 does not include any portion that extends away from the display cover 204 that the second hinge plate 104 is inserted into.

After the hinge 100 is coupled to the display cover 204 via the insert molding process, the first hinge plate 102 may be coupled to the system cover 202. The first hinge plate 102 may be coupled to the system cover 202 using a screw, or other mechanical fastening means, through the at least one opening 106.

Notably, the second hinge plate 104 is coupled to the display cover 204 via the insert molding process before the first hinge plate 102 is coupled to the system cover 202. Performing the insert molding process to couple the second hinge plate 104 to the display cover 204 may be difficult with the system cover 202 coupled to the first hinge plate 102.

The system cover 202 may enclose a processor (CPU) 204 and a memory 206. The system cover 202 may enclose or house additional components such as a keyboard, network cards, a power supply and other hardware components (not shown) of the laptop computer 200.

Figure 3:
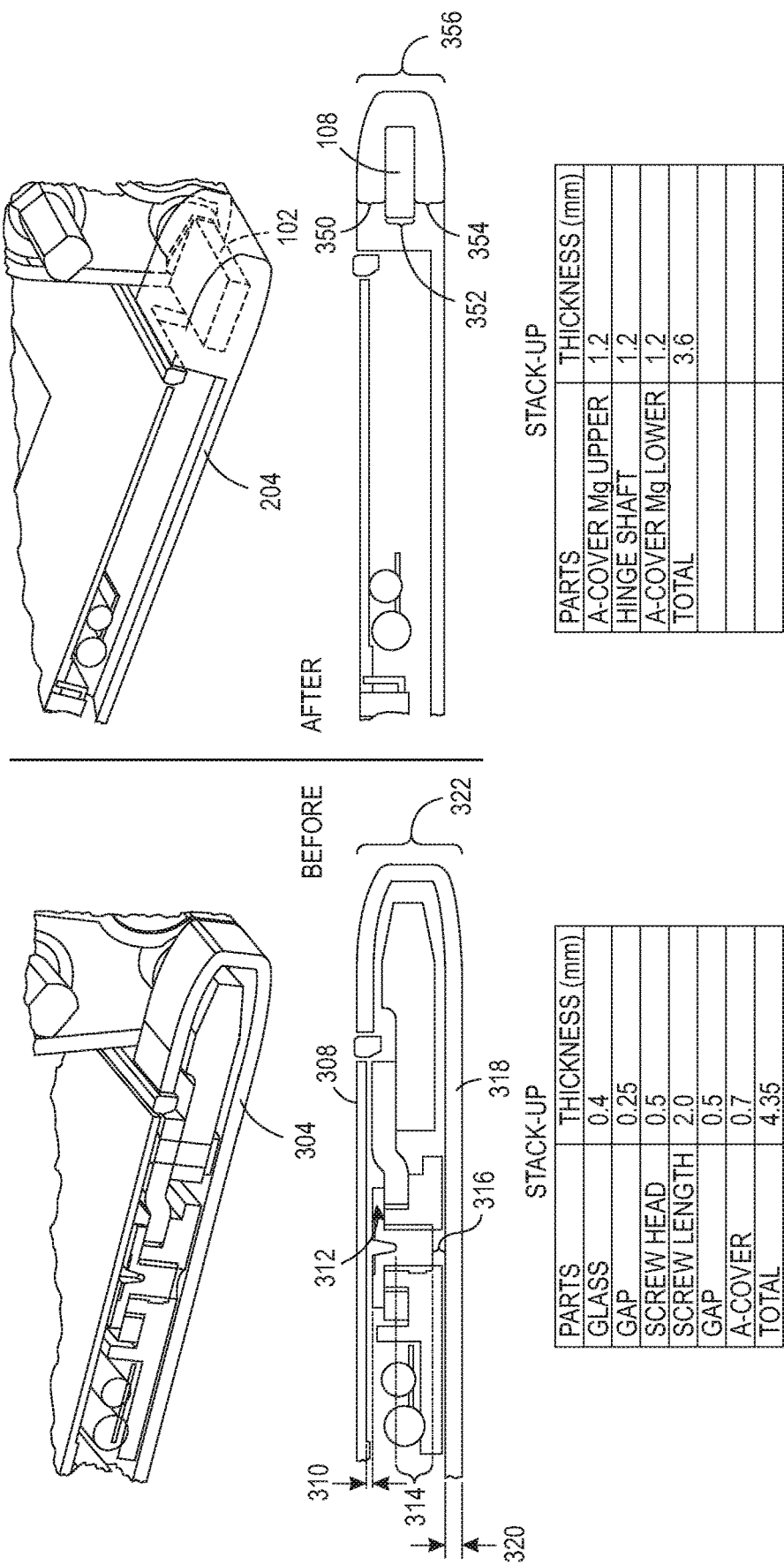
FIG. 3 is a block diagram of an example comparison of a thickness of laptop computers.

FIG. 3 illustrates an example comparison of the reduction in thickness using the hinge 100 of the present disclosure as compared to previously used hinges. Previous hinge designs used a hinge plate that also included openings for a screw to be coupled to the display cover 204. As shown in FIG. 3, an overall thickness 322 (also referred to as the "z stack") of a previous display cover 304 would be approximately 4.35 millimeters (mm). The thickness would comprise a glass 308 having a thickness of 0.4 mm, a gap 310 between the glass 308 and a screw head 312 of 0.25 mm, a thickness of 0.5 mm of the screw head 312, a screw body 314 having a length of 2.0 mm, a second gap 0.5 between a bottom of the screw body 314 and the previous display cover 304 and a thickness of 0.7 mm of a wall 320 of the previous display cover 304.

In contrast, the present design allows the display cover 204 to have an overall thickness 356 of 3.6 mm. In other words, the design of the hinge 102 allows the overall thickness 356 of the display cover 204 to be reduced by over 17% compared to the overall thickness 322 of the previous display cover 304. The overall thickness 356 of the display cover 204 may include an upper wall 352 having a thickness of approximately 1.2 mm, the tab member 108 having a thickness of approximately 1.2 mm and a lower wall 354 of the display cover 204 having a thickness of approximately 1.2 mm.

In addition, FIG. 3 illustrates how the hinge 100 of the present disclosure reduces the number of components used to couple the hinge 100 to the display cover 204. For example, in design of the present disclosure a single physical component (e.g., the tab member 108) is used to couple the display cover 204 to the hinge 100.

In contrast, the previous display cover 304 requires a hinge plate with openings, screws, a mechanism within the previous display cover 304 to receive the screws, and the like. As a result, the hinge 100 of the present disclosure provides a more efficient design that is simpler and easier to install as compared to previous designs.

Figure 4:
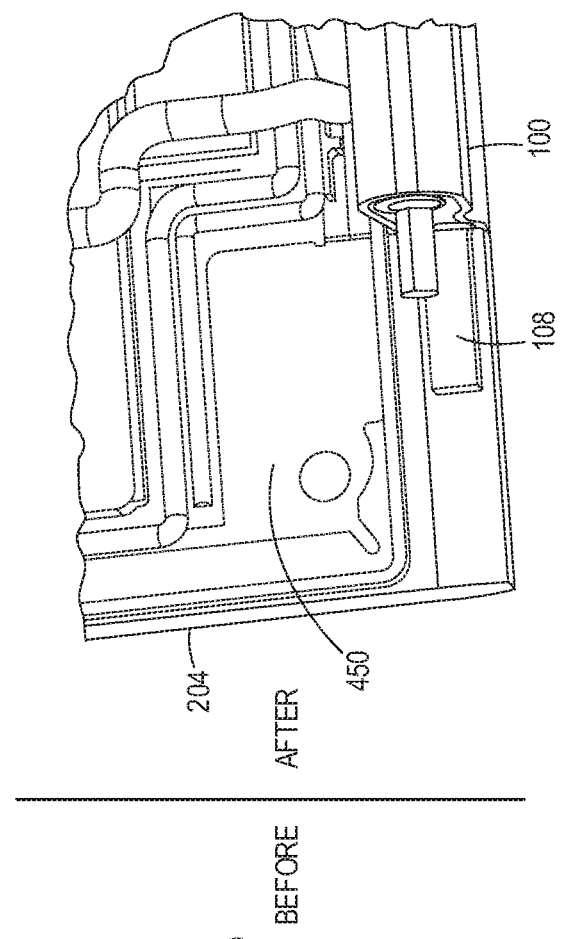
FIG. 4 is a block diagram of an example comparison of additional space available in the laptop computer.
Figure 4:
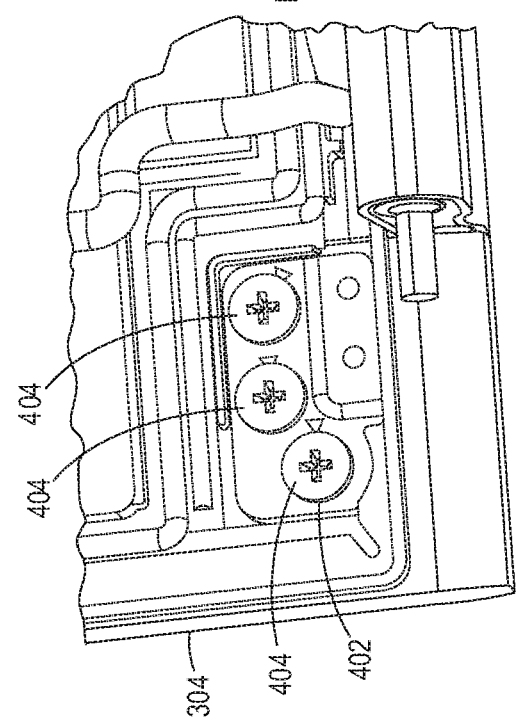

FIG. 4 illustrates a block diagram of an example comparison of an increased amount of available space in the display cover 204 as compared to the previous display cover 304. As illustrated in FIG. 4, the previous display cover 304 used a hinge plate 402 that used screws 404 through the openings of the hinge plate 402. As noted above, this created the previous display cover 304 that was thicker than the display cover 204.

In addition, the screws 404 and the hinge plate 402 occupied space within the previous display cover 304. In contrast, the hinge 100 of the present disclosure creates an open volume 450 within the display cover 204. The open volume 450 may be used to run additional wiring or add other components within the display cover 204.

Figure 5:
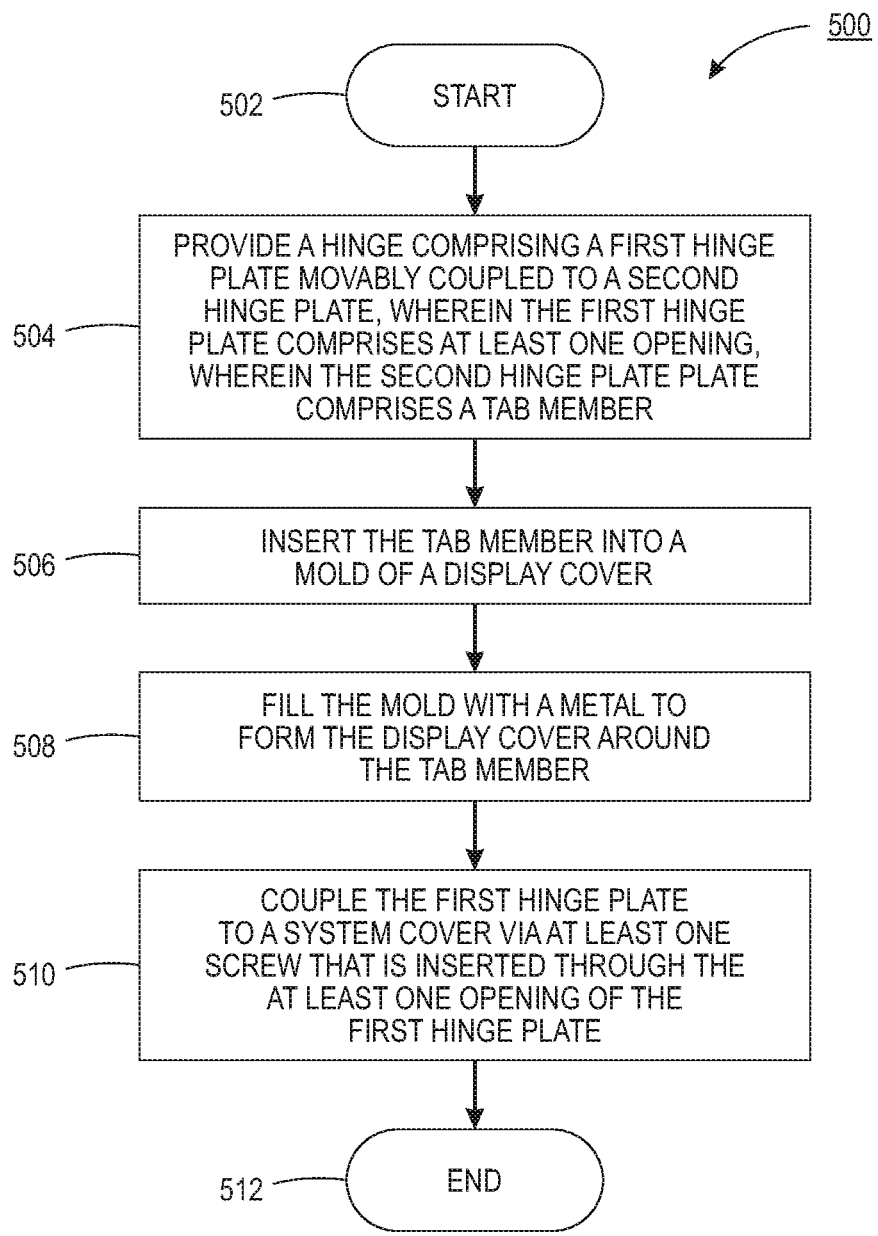
FIG. 5 is a flow diagram of an example method for inserting molding a hinge into a cover of the laptop computer.

FIG. 5 illustrates a flow diagram of an example method 500 for insert molding a hinge into a cover of the laptop. In one example, the cover may be the display cover or "A" cover. In one example, the blocks of the method 500 may be performed by one or more machines of an automated assembly line that is controlled by a processor.

At block 502, the method 500 begins. At block 504, the method 500 provides a hinge comprising a first hinge plate movable coupled to a second hinge plate, wherein the first hinge plate comprises at least one opening, wherein the second hinge plate comprises a tab member. In one implementation, the tab member may have a rectangular shape, a cylindrical shape, a "T" shape, and the like.

In one example, the first hinge plate may be movably coupled to the second hinge plate to allow the second hinge plate to rotate. For example, the display cover may be gated, or opened, relative to the system cover. In addition, the mechanical coupling may allow the display cover to hold a desired position when the mechanical coupling is not moved or rotated.

At block 506, the method 500 inserts the tab member into a mold of a display cover. In one implementation, the mold may have a predefined position that the tab member may be placed into.

At block 508, the method 500 fills the mold with a metal to form the display cover around the tab member. In one example, the metal may be a melted metal or a liquid form of the metal. The metal may be magnesium (Mg), aluminum (Al), stainless steel and the like.

The metal may be poured into the mold, or casted, to enclose the tab member. The metal may be allowed to solidify. As a result, the tab member may be fixed, or coupled, to the display cover by the solidified metal.

In one example, the blocks 504, 506 and 508 may be repeated for a second hinge. For example, two hinges may be used to couple the display cover to the system cover. In one example, the respective tab member of the respective second hinge plate of the two hinges may be inserted to a respective predefined position within the mold for the display cover. Then the mold may be filled with the melted metal to allow the metal to solidify around both hinges and to couple both hinges to the display cover.

At block 510, the method 500 couples the first hinge plate to a system cover via at least one screw that is inserted through the at least one opening of the first hinge plate. For example, the hinge is coupled to the display cover via the insert molding process, and the laptop assembly may be completed by coupling the first hinge plate to the system cover. At block 512, the method 500 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:
1. A hinge, comprising:
   a first hinge plate comprising at least one opening, wherein the first hinge plate is coupled to a system cover of a mobile endpoint device via at least one screw fitted through the at least one opening;
   a second hinge plate movably coupled to the first hinge plate, wherein the second hinge plate comprises a tab member that extends in an opposite direction of the first hinge plate, wherein the tab member comprises a solid shape free from openings and is coupled to a display cover of the mobile endpoint device via an insert molding process; and a hinge cap to enclose a portion of the first hinge plate and the second hinge plate that are movably coupled.

2. The hinge of claim 1, wherein the at least one opening of the first hinge plate is located on an extended member portion of the first hinge plate.

3. The hinge of claim 2, wherein the tab member and the extended member portion of the first hinge plate do not overlap.

4. The hinge of claim 1, wherein the tab member comprises stainless steel.

5. The hinge of claim 1, wherein the first hinge plate and the second hinge plate are movably coupled to allow gating of the system cover and the display cover.

6. An apparatus, comprising:
 a display cover enclosing an electronic display;
 at least one hinge comprising a first hinge plate movably coupled to a second hinge plate, wherein the second hinge plate comprises a tab member that extends in an opposite direction of the first hinge plate and is coupled to the display cover via an insert molding process, wherein the tab member comprises a solid shape free from openings; and
 a system cover comprising a keyboard and enclosing a plurality of electronic components, wherein the system cover is coupled to the first hinge plate via at least one screw.

7. The apparatus of claim 6, wherein the tab member comprises stainless steel.

8. The apparatus of claim 6, wherein the first hinge plate comprises at least one opening on an extended member portion of the first hinge plate and the at least one screw is fitted through the at least one opening to couple the system cover to the first hinge plate.

9. The apparatus of claim 8, wherein the extended member portion and a tab member of the second hinge plate do not overlap.

10. The apparatus of claim 7, wherein the apparatus comprises a laptop computer.

11. A method comprising:
 providing a hinge comprising a first hinge plate movably coupled to a second hinge plate, wherein the first hinge plate comprises at least one opening, wherein the second hinge plate comprises a tab member comprises a solid shape free from openings and extends in an opposite direction of the first hinge plate;
 inserting the tab member into a mold of a display cover;
 filling the mold with a metal to form the display cover around the tab member; and
 coupling the first hinge plate to a system cover via at least one screw that is inserted through the at least one opening of the first hinge plate.

12. The method of claim 11, wherein the metal comprises melted magnesium.

13. The method of claim 11, wherein the tab member comprises stainless steel.

* * * * *